United States Patent [19]

Inbar et al.

[11] Patent Number: 4,852,576
[45] Date of Patent: Aug. 1, 1989

[54] TIME GAIN COMPENSATION FOR ULTRASONIC MEDICAL IMAGING SYSTEMS

[75] Inventors: Dan Inbar; Moshe Delevy, both of Haifa, Israel

[73] Assignee: Elscint Ltd., Haifa, Israel

[21] Appl. No.: 106,020

[22] Filed: Oct. 8, 1987

Related U.S. Application Data

[63] Continuation of Ser. No. 719,204, Apr. 2, 1985, abandoned.

[51] Int. Cl.[4] .................................................. A61B 8/00
[52] U.S. Cl. .................................... 128/660.6; 73/602; 73/631; 73/900
[58] Field of Search .................. 128/660; 73/599, 602, 73/631, 900

[56] References Cited

U.S. PATENT DOCUMENTS

| | | | |
|---|---|---|---|
| 3,690,153 | 9/1972 | Matay | 73/631 |
| 4,043,181 | 8/1977 | Nigam | 73/631 |
| 4,176,658 | 12/1979 | Kossoff et al. | 128/660 |
| 4,356,731 | 11/1982 | Mahoney . | |
| 4,408,492 | 10/1983 | Kossoff et al. | 73/631 |
| 4,452,085 | 6/1984 | Pelc et al. | 73/631 |
| 4,470,303 | 9/1984 | O'Donnell | 73/602 |
| 4,475,398 | 10/1984 | Tjornehoj et al. | 73/599 |
| 4,513,621 | 4/1985 | Renzel et al. | 73/631 |
| 4,569,353 | 2/1986 | Ferrari | 128/660 |

FOREIGN PATENT DOCUMENTS

| | | | |
|---|---|---|---|
| 1329733 | 5/1963 | France | 73/631 |
| 1534366 | 12/1978 | United Kingdom | 128/660 |

OTHER PUBLICATIONS

Ophir et al., "Digital Scan Converters in Diagnostic Ultrasound Imaging", Proceedings of the IEEE, vol. 67, No. 4, Apr. 1979, p. 654–664.

DeClereq et al., "Adaptive Gain Control for Dynamic Ultrasound Imaging", 1975, Ultrasonic Symposium Proceedings IEEE, p. 59–63.

Primary Examiner—Ruth S. Smith
Attorney, Agent, or Firm—Sandler & Greenblum

[57] ABSTRACT

Time gain compensation is provided on an automatic basis by storing an amplification gain function for an amplifier operating on the received signals and automatically varying the function until the intensity versus time functions of the received signal is substantially flat.

12 Claims, 3 Drawing Sheets

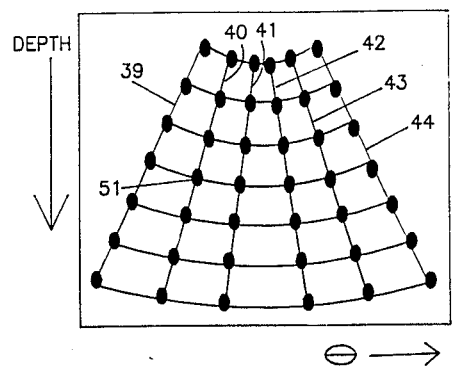
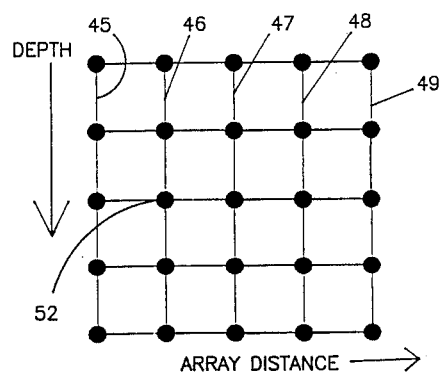
FIG. 2A    FIG. 2B
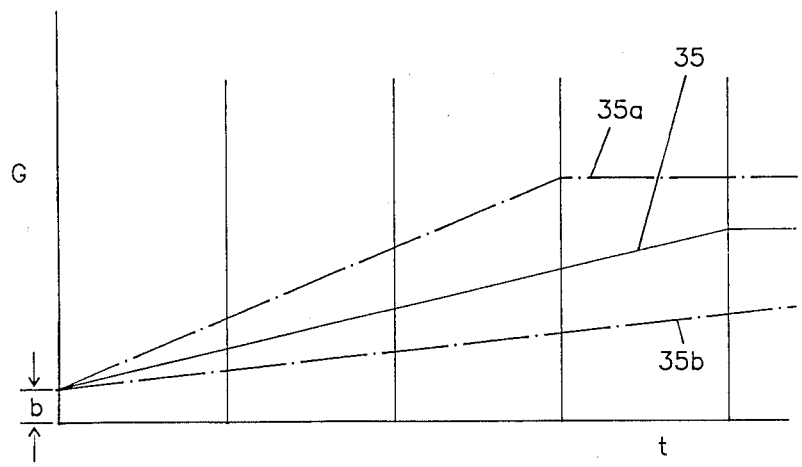
FIG. 3.

TIME GAIN COMPENSATION FOR ULTRASONIC MEDICAL IMAGING SYSTEMS

This application is a continuation of application Ser. No. 719,204, filed Apr. 2, 1985 now abandoned.

FIELD OF THE INVENTION

This invention is concerned with ultrasonic scanning systems for medical imaging and more particularly with time-gain compensation (TGC) for such systems.

BACKGROUND OF THE INVENTION

Ultrasonic scanning systems acquire data and provide medical images of the interior of patients using the acquired data. In general the systems use transducers to transmit ultrasonic waves in the order of several megahertz in frequency into a subject or a patient. "Echo" signals are received and used as the data for the images. In general the transducer is positioned juxtaposed to the patient's body. The intensities of the received echo signals are measured. The location of the echo generating material (i.e. boundaries of organs and the like) is determined by the time required for the echo to return after the original signal is transmitted. The acquisition of the intensity data correlated to location in the body enables obtaining intensity values for image pixels corresponding to body locations as is required for providing images.

A long standing problem encountered in the acquisition of ultrasonic imaging data is the attenuation of the signals due to the distance traversed by the signals. Therefore, echoes received from further within the body have much less intensity than echoes received from the same type of tissue boundaries which are close to the surface of the body. For imaging purposes the echoes coming from the same type of tissue boundaries should have the same intensity without regard to the distance. The attenuation thus amounts to a distortion. Normally to overcome this distortion, ultrasonic systems are provided with TGC equipment to correct the intensity of the echoes so that the intensities are the same for echoes received from tissues deep within the body as they are for similiar tissues close to the surface of the body.

The echo signals are relatively weak and require amplification. In practice the gain of the amplifier is varied by the TGC equipment to overcome the effect of the attenuation of the echo signal due to depth. Care has to be taken in the use of the TGC equipment to prevent or at least minimize the adverse effect of the varying gain on actual data.

The prior art TGC equipment requires the doctor to make the adjustments of the amplifier gain by eye based on his view of the image. Thus, the doctor attempts to vary the amplifier gain while looking at the image to overcome the depth caused attenuation. Originally the attempt at compensating the image intensity for depth was accomplished with analog signals used to control the amplifier gain. More recently the amplifier gain has been controlled using digital signals stored as preprogrammed charts. See for example, U.S. Pat. No. 4,356,731 which issued on Nov. 2, 1982 and teaches a method for generating TGC signals for use in ultrasonic scanners and the like. More particularly the patent teaches utilizing a preprogrammed chart stored in a RAM to define the amplifier gain function. Thus, the doctor operates the control panel to generate address signals causing the preprogrammed chart of the RAM to provide the amplification factor on a digital basis in order to compensate for the depth caused attenuation.

A problem with the prior art systems is that the operator of the system (i.e. the doctor or clinician making the test) has to manipulate the ultrasound scanner while operating manual controls to vary the amplification gain to obtain intensity signals independent of distance. Thus, the doctor has to operate the scanner, operate control buttons and observe the image all at the same time. Accordingly with the prior art systems it is difficult to make gain corrections speedily and in a reliable manner.

Therefore there is a need for ultrasound imaging systems which automatically provide TGC for ultrasound imaging without the necessity of operating controls to correct for the changes in the intensity of the echo signal due to the depth travelled by the transmitted ultrasound signals.

A related problem faced by all TGC circuits and methods used with ultrasound systems is to assure that the time gain compensation does not destroy or adversely effect the data which after all comprises signals of varying intensity.

Accordingly improved TGC circuits and methods are required which can vary the ultrasound system amplification on a real time basis to compensate for attenuation caused by the distance travelled through the subject's body while preserving the actual data.

BRIEF DESCRIPTION OF THE INVENTION

According to a broad aspect of this invention, a TGC method for ultrasound imaging systems is provided, said method broadly comprises the steps of:
  determining the attenuation characteristic in real time of a body being examined, and
  varying the gain of the receiver circuit responsive to said attenuation characteristics to compensate for the determined attenuation.

A more particular aspect of the invention comprises the steps of:
  transmitting ultrasonic signals into a subject,
  receiving echoes back from the subject,
  locating the source of the echoes,
  amplifying the received echoes,
  measuring the intensity of the echoes,
  placing the measured intensities as pixel values into pixels according to the echo source locations, whereby the locations of the pixel values in the image correspond to the locations of the source of the echoes in the body being examined,
  using the pixel values to determine the attenuation characteristics of the subject,
  changing the amplification gain to provide echoes having intensities independent of the distance between the transducer and source of the echo in the subject, and wherein changing the amplification gain comprises:
  varying the gain using the complement of the determined attenuation characteristics, by subtracting the determined attenuations from zero.

A feature of the invention includes the steps of:
  fitting straight lines to the subject's measured intensity per depth characteristics, and
  using the complement of the slope of the fitted straight lines to vary the gain to compensate for the subject's attenuation characteristics.

A related feature of the invention provides for the steps of:
  determining the slope of the fitted straight lines,
  determining gain factors to set said slope equal to zero, damping said gain factors, and
  using the gain factors dampened to change the gain of the amplifiers.

BRIEF DESCRIPTION OF THE DRAWINGS

The above mentioned and other features and objects of the present invention will be better understood when considered in the light of the following description, taken in conjunction with the accompanying drawings; wherein:

FIG. 2A and 2B are sector and rectangular displays acquired using different types of ultrasound scanners, FIG. 3 shows amplifier gain curves of the type provided by the TGC of FIG. 1;

GENERAL DESCRIPTION

Figure 1:
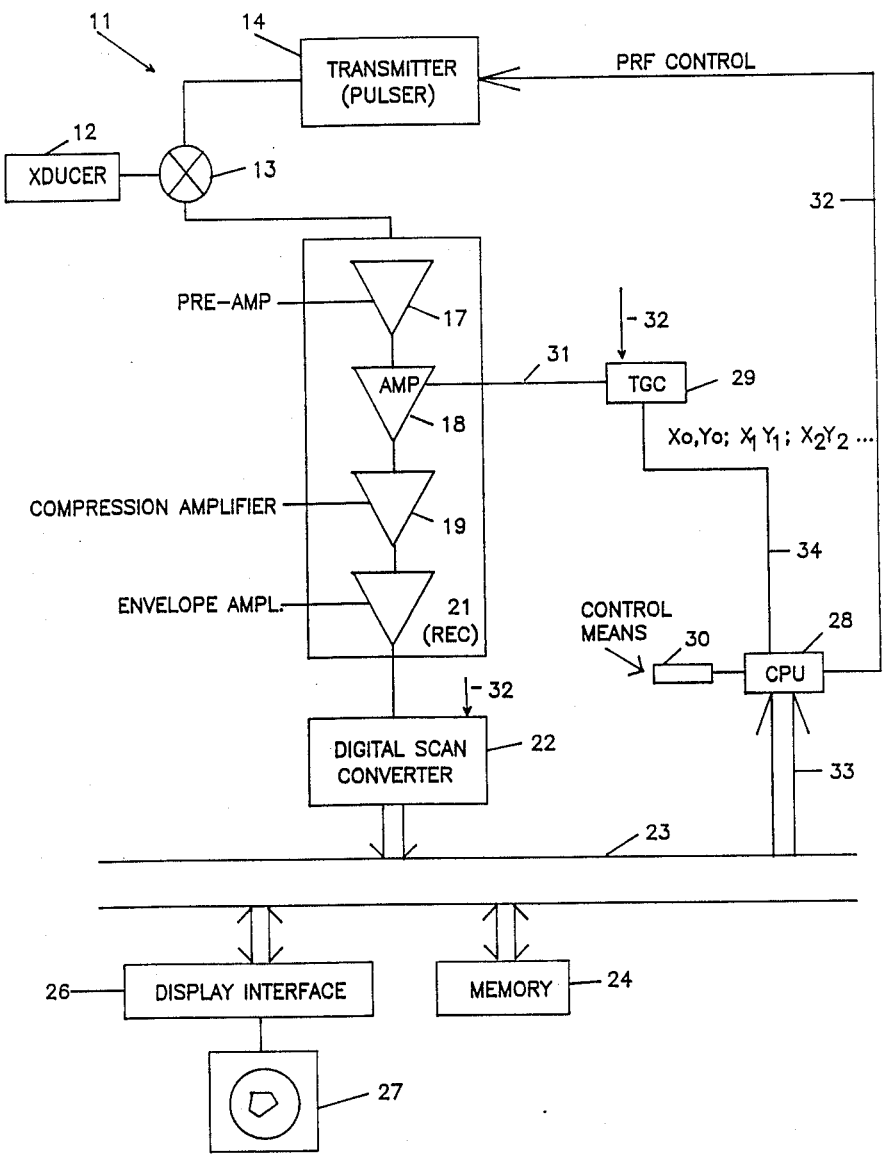
FIG. 1 is a block diagram of an ultrasound system including automatic TGC circuitry.

The ultrasonic system 11 of FIG. 1 includes a transducer 12 which may be of the type that is held against the patient's body and automatically scans over a prescribed sector area by transmitting ultrasonic signals into the body. The transducer in the receiving mode generates electrical signals in response to reflections or echoes of the transmitted ultrasonic signals.

The transducer 12 is shown connected through an electronic switch means 13 for selecting either the transmitting mode or receiving mode. In the transmitting mode a transmitter or pulser 14 is connected to the transducer through the electronic switching means 13. In the receiving mode the receiver unit 16 is connected to receive the electrical signals generated in response to the echoes received from the subject.

The receiver in a preferred embodiment comprises a preamplifier 17. The output of the pre-amplifier 17 is shown connected to a gain controlled amplifier 18. The output of the amplifier 18 is compressed by amplifier 19 to match the db spreads of the received signals and of the imaging equipment. The output of compression amplifier 19 provides input signals for an envelope detector amplifier 21 whose output is the envelope of the detected echo signals. The receiver 16 provides signals to a digital scan converter 22 which generally takes the received intensity signals along with time signals and sector angle or array position signals and converts them to intensity per depth location signals. More particularly the circuit 22 converts the intensity signals to signal values per pixel.

The signal value of the pixels are communicated through fast bus 23 to memory 24 and from the memory to the display interface 26 in any well known manner. The display interface 26 converts the pixel data into the images displayed on display unit 27.

The transmitting, receiving and other functions of the system are controlled by a central processing unit (CPU) 28. For example, the CPU 28 is shown as providing pulse frequency controls for the pulser 14 over conductor 32. The pulser rate frequency controls are also coupled to other time dependent circuits. It should be understood that only the portions of ultrasonic systems necessary for an explanation of this invention are shown. Ultrasonic imaging systems are well known to those skilled in the art and therefore the explanation contained herein does not elaborate on the known fundamentals of the ultrasonic imaging systems. By way of example timing circuits and angular displacement circuits used to locate the sources of the echoes are not shown.

Means are provided for automatically controlling the gain of the amplifier 18. More particularly a TGC circuit 29 is shown operating under the control of CPU 28. The CPU receives pixel values from memory 24 through buses 23 and 33. The CPU operates on the pixel values to obtain amplifier gain controlling signals that are location oriented. The CPU sends those amplifier gain determining location oriented signals Xo,Yo; X1,Y1 ... Xn,Yn to the TGC circuit. The TGC circuit uses these signals to control the gain of amplifier 18 so that the slope of the intensity versus depth characteristic of the system approaches zero. The gain is varied by signals sent over conductor 31 to amplifier 18.

Figure 5:
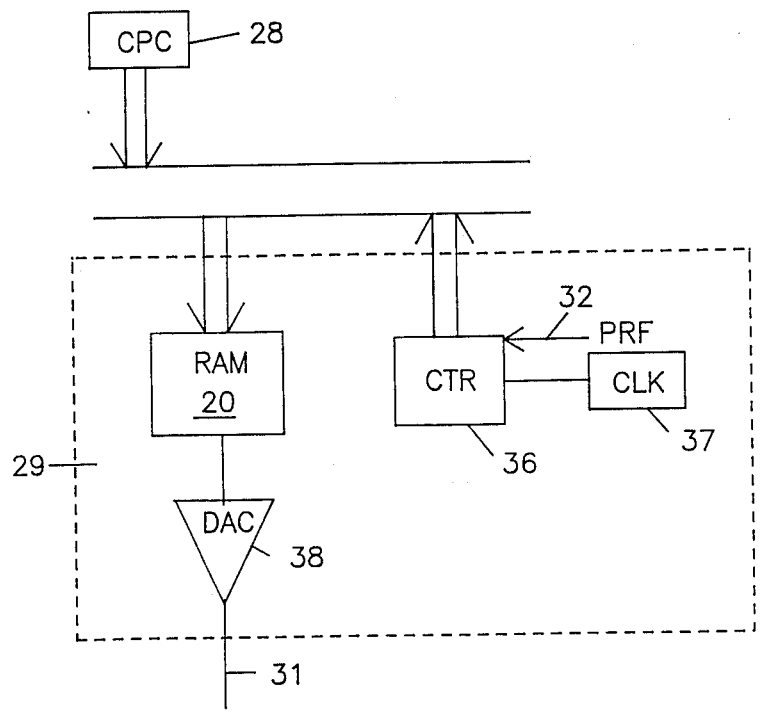
FIG. 5 is a block diagram showing of a TGC circuit embodiment.

In one embodiment shown in FIG. 5 the TGC circuit 29 includes a RAM 20 having a pre-set gain function. The pre-set function is shown for example by the solid line 35 in FIG. 3. The gain function can be varied as indicated by the dash dot lines 35a and 35b of FIG. 3.

The TGC circuit is further shown as including a counter 36 having a clock 37 attached thereto. Reset signals are provided by the pulse repetition rate control signal from conductor 32. The counter provides address data for the RAM 20. A digital to analog converter 38 is connected between the RAM 20 and output conductor 31.

In practice the variation in the gain function can be accomplished at a plurality of different time or depth settings on an automatic basis. The system however, may be operated manually or automatically at the option of the user. The control means indicated at 30 in FIG. 1 is provided for selecting automatic or manual operation of the gain function variation. If the manual mode is selected then the doctor or clinician operting the system continuously monitors the image received and varies the gain as is accomplished in the prior art. That is the operator attempts to visually maintain an intensity that is not dependent on the distance that the ultrasonic signal has travelled.

In the automatic mode, the gain is initially automatically controlled by the time controlled gain function initially stored in the RAM 20. This stored function is automatically varied by the system on a real time basis; i.e. on-line. In a preferred embodiment the gain is controlled as a function of the penetration depth of the ultrasonic beam. That is the depth is divided into a plurality of segments. Each segment is provided with its own gain correction. Also the gain compensation is synchronized with the transmitted pulses as indicated by arrow 32 entering circuit 29 in FIG. 1 and counter circuit 36 in FIG. 5, indicating pulse repetition frequency synchronization signals.

The transformed amplified electrical signals from the memory 24; i.e. the pixel gray level signals are sent to CPU 28 over bus 33. In this manner the intensity versus depth values that are obtained, stored in memory 24, and subsequently used for display are also used to determine the on-line gain required to compensate for the unwanted attenuation.

Figure 4:
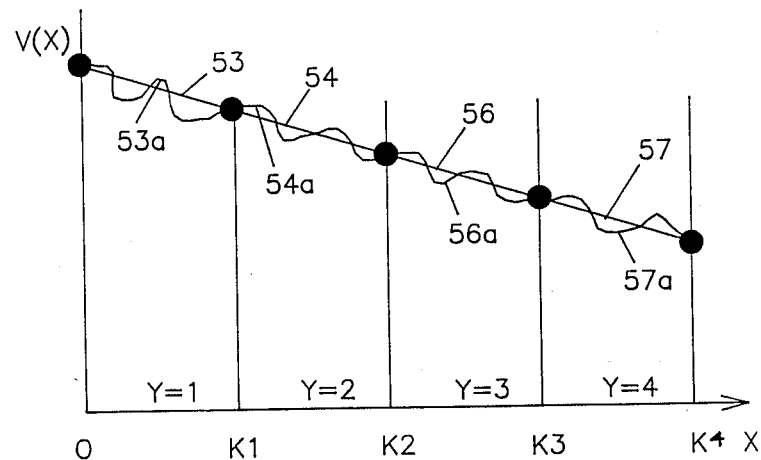
FIG. 4 is an intensity versus depth function of the type obtained using an ultrasound scanning system.

The intensity signal as a function of time is shown in FIG. 4 prior to correction. This graph shows the attenuation characteristic of the signal due to the depth travelled to and from the object providing the echo.

The CPU 28 receives the acquired intensity vs. depth location data over bus 33 and converts it to characteristic attentuation curves for the subject under examination. More particularly, in practice, the ultrasonic beam length is divided into segments and the characteristic attenuation is found for each of the segments. The complement of the attenuation is the gain control data. The CPU 28 transmits the gain control data to the TGC circuit 29. The TGC circuit uses this data to vary the gain of amplifier 18 to compensate for the attenuation.

There are many different ways of determining the attenuation characteristics of the subject and of using the characteristic to vary the gain. In general the CPU 28 reads a plurality of sampled vectors from the memory 24. The vectors are shown for example in FIG. 2A as vectors 39-44 and as vectors 45-49 in FIG. 2B.

FIG. 2A is taken from a sector scan and FIG. 2B is taken from rectangular scan such as provided by linear array scanners. Intensity data is taken from depth points on the vectors of FIGS. 2A and 2B, such as points 51 and 52 for example.

The CPU unit 28 in a preferred embodiment includes means for fitting a "curve" to the data; i.e., the varying intensity values obtained during the scans. This is illustrated by the straight line segments 53,54,56 and 57 fitted to the jagged original "curve" segments 53a,54a,56a and 57a of FIG. 4. The slope of "curve" segment 53a is obtained from the straight line segment 53. The "curve" segments 53a, 54a, 56a and 57a of FIG. 4 are generated by the system from the intensity values at the pre-fixed equally spaced points on the depth scale that is, the distance 0-K1, K1-K2, K2-K3 and K3-K4 are all equal. Equal distance lines are indicated by the curved lines of FIG. 2A and the horizontal lines of FIG. 2B. Intensity measurements are obtained at the intersection of the sample beam line and the equal distance lines as indicated by the dots. These intensity measurements are averaged according to a preferred method and the average value is plotted logrithmically on the intensity versus time curve of FIG. 4. Straight lines are then fitted to the averaged raw data curve segments to obtain the slope of the curve. The slope is the attenuation characteristic of the subject; i.e. the attenuation due to depth.

In a preferred embodiment a least squares method of fitting straight line segments to the curve segments 53a, 54a, 56a and 57a is used. The slopes are determined from the straight line segments. A function Z is set up that is the summation of the power of two of each of the differences between the averaged intensity vector V(X) at each depth point X—the value of the straight line at the point X; i.e. aX+b where a is the slope and b is the value where X=0. In practice the equation defining the function Z is differentiated with respect to the slope and set equal to zero, to obtain values for the slopes. This provides numerical values which serve as correction factors for the amplifier gain; that is, the gain of amplifier 18 is varied over the desired time ranges say from Ko-K1 from K1-K2 or K2-K3 and K3 to K4 ... Kn−1 to Kn.

The curve is fitted for each time range desired, i.e. 0-K1, K1- K2, K2-K3 etc.

The differential of the fitted "curve" (Z) is set equal to zero i.e. dZ/da=0, to obtain values of a, and Setting X=0 is used to obtain values of b.

The value of "a", is the actual slope at each point. A correction factor is derived from the values to use in changing the function stored in the TGC.

The system operates to obtain the attentuation characteristics of the subject by reading sampled vectors from the memory 24 and sending the data to the CPU 28. The CPU averages the sampled data to obtain an average vector i.e. the average intensity V(I) per unit depth.

A least square function equation is set up and solved based on the following assumptions:
(a) the curve should be continuous along the whole depth;
(b) there should be a plurality of individual segments along the depth with each segment having its own attenuation factor; and
(c) the best fit should be found for each of the individual segments along the entire depth.

For example, the individual attenuation for each segment can be found, any discontinuities at segment boundaries can be averaged to obtain a continuous function or equations can be set up to assure a continious function i.e.

$$Y_i = a_i K_i + b_i$$

for segments Y=1, Y=2, Y=3, and Y=4. A set of equations is used $$a_i K_i + b_i = a_{(i+1)} K_{(a+1)} + b_{(i+1)}$$

where Ki indicates the depth point of the ends and beginnings of the segments. In the continuous curve the straight lines meet at the K points.

The gain required is the number required to be added to the attenuation to set it to zero. Thus if the attenuation (slope) number is −1 then +1 has to be added. To prevent oscillation a damping factor (say ½ or ¼) is used for multiplying the correction factor that is to be added to the slope.

The TGC circuit corrects the gain curve using this information from the CPU.

In one embodiment the data received from the memory 20 after use of the dampened gain factor is compared to a threshold. If it is smaller than the threshold, than the stored curve is no longer changed although all the functions of the CPU continue.

In summation amplification factors are determined from the value of the slope. The factor is the amplification necessary to change the slope to zero. The factor is used to vary the stored function. The corrected function is used and the computations are repeated until the test is over or there is sufficient convergence.

The system provides a gain in the amplifier 18 to overcome the attenuation inherent due to the distance travelled by the signals to and from the transducer.

The system operates to have the transducer transmit an ultrasonic signal. Echoes are received at the transducer. The echoes are amplified by amplifier 18. The gain of the amplifier is automaticaly adjusted to obtain a slope approaching zero on the characteristic intensity versus depth curve shown in FIG. 4. More particularly, the gain of the amplifier 18 is varied in accordance with a stored gain curve function. The stored function is automatically corrected and the gain of the amplifier 18 is automatically adjusted for a plurality of depth segments to automatically obtain a substantially zero slope on the intensity versus depth curve of FIG. 4.

While the invention has been explained using particular embodiments, it should be understood that these embodiments are described by way of example only and not as a limitation to the scope of the invention.

What is claimed is:

1. An ultrasonic imaging method including time gain compensation (TGC) to correct received ultrasonic echoes for attenuation due to distance traversed by ultrasonic signals and echoes, said method for use with ultrasonic imaging system having transmitting and receiving means for transmitting the ultrasonic signals and receiving means for transmitting the ultrasonic signals and receiving the ultrasonic echoes, said receiving means having gain varying means, said method comprising determining attenuation characteristics of a body being examined, said determining step comprising the steps of:
   (a) transmitting beams of ultrasonic signals into said body, the direction of transmittal being a depth direction;
   (b) receiving echoes back from the interior of the body;
   (c) locating the source of the echoes;
   (d) amplifying the received echoes;
   (e) measuring the intensity of the amplified received echoes;
   (f) converting the measured intensity into pixel values according to the echo source location whereby the location of the pixel value in the image corresponds to the echo source location in the body being examined;
   (g) selecting pixels along ultrasonic beams extending in the depth direction;
   (h) dividing said scanned depth into a plurality of segments;
   (i) using rows of the selected pixels to obtain average pixel values per segment in the depth direction;
   (j) said average pixel values providing intensity versus depth values for use in determining an intensity versus depth function extending along the scanned depth of the body;
   (k) fitting an intensity versus depth function curve over each of said plurality segments;
   (l) the slopes of said curves being the determined attenuation characteristics of the body; and
   the step of using the determined attenuation to vary the gain of the receiving means.

2. The method of claim 1 wherein said step of fitting curves to the function at each of said segments comprises using a least squares method.

3. The method of claim 2 including the step of determining attenuation characteristics of the body from a straight line fitted to each of the segments in a continuous curve.

4. The method of claim 3 wherein any discontinuities at the junction of the straight lines fitted to each of the segments are averaged to provide a continuous curve of straight lines with no discontinuities.

5. The method of claim 1 wherein the attenuation value obtained for each of the segments is used to obtain gain factors for the amplifier for these segments by finding the complement of the attenuation value.

6. The method of claim 5 wherein said gain factor is multiplied by a damping factor prior to using the gain factor to vary the gain of the receiver.

7. The method of claim 6, wherein said gain factor multiplied by the damping factor is added to the gain factor of a stored gain curve used to control the gain of the receiver.

8. The method of claim 7 including the step of comparing said attenuation values to a threshold, and
   using the gain curve values only when said attenuation values are more than the threshold.

9. The method of claim 6 and comparing the gain factor to a threshold to determine whether to use the gain factor in controlling the gain of the amplifier.

10. An ultrasonic imaging method including time gain compensation (TGC) to correct received ultrasonic echoes for attenuation due to distance traversed by ultrasonic signals and echoes, said method for use with ultrasonic imaging systems having transmitting and receiving means for transmitting the ultrasonic signals and receiving the ultrasonic echoes, said receiving means having gain varying means, said method comprising determining attenuation characteristics of a body being examined, said determining step comprising the steps of:
   (a) transmitting beams of ultrasonic signals into said body, the direction of transmittal being a depth direction;
   (b) receiving echoes back from the interior of the body;
   (c) locating the source of the echoes;
   (d) amplifying the received echoes;
   (e) measuring the intensity of the amplified received echoes;
   (f) converting the measured intensity into pixel values according to the echo source location whereby the location of the pixel value in the image corresponds to the echo source location in the body being examined;
   (g) selecting pixels along ultrasonic beams extending in the depth direction;
   (h) dividing said scanned depth into a plurality of segments;
   (i) using rows of the selected pixels to obtain average pixel values per segment in the depth direction;
   (j) said average pixel values providing intensity versus depth values for use in determining an intensity versus depth function extending along the scanned depth of the body;
   (k) fitting an intensity versus depth function line over each of said plurality of segments;
   (l) the slope of each of said lines being one of the determined attenuation characteristics;
      providing a predetermined gain function to control the amplification of the received echoes to provide echoes having intensities independent of the distance between the transducer and the source of the echo; and
      automatically varying the gain function as a function of the determined attenuation characteristics.

11. The method of claim 10 including the further step of using the complement of the slopes of the lines to vary the predetermined gain function.

12. The method of claim 11 including the step of:
   damping the complement of the slope prior to using said complement to vary said predetermined gain function.

* * * * *